United States Patent
Rozman et al.

(10) Patent No.: US 9,985,562 B1
(45) Date of Patent: May 29, 2018

(54) ELECTRIC POWER GENERATING SYSTEM WITH A SYNCHRONOUS GENERATOR AND TUNABLE FILTER

(71) Applicant: Hamilton Sundstrand Corporation, Charlotte, NC (US)

(72) Inventors: Gregory I. Rozman, Rockford, IL (US); Jacek F. Gieras, Glastonbury, CT (US); Steven J. Moss, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days. days.

(21) Appl. No.: 15/453,383

(22) Filed: Mar. 8, 2017

(51) Int. Cl.
| | |
|---|---|
| H02P 11/00 | (2006.01) |
| H02H 7/06 | (2006.01) |
| H02P 9/00 | (2006.01) |
| H02P 9/34 | (2006.01) |
| H02K 11/04 | (2016.01) |
| H02P 5/00 | (2016.01) |
| H02P 5/46 | (2006.01) |

(52) U.S. Cl.
CPC .............. H02P 9/34 (2013.01); H02K 11/046 (2013.01)

(58) Field of Classification Search
USPC ...................................... 322/28; 318/85, 779
See application file for complete search history.

(56) References Cited

U.S. PATENT DOCUMENTS

| | | | |
|---|---|---|---|
| 3,896,349 A * | 7/1975 | Lozenko | H02P 5/74 318/400.08 |
| 5,318,142 A | 6/1994 | Bates | |
| 5,430,362 A * | 7/1995 | Carr | F02N 11/04 318/139 |
| 6,873,134 B2 | 3/2005 | Canter | |
| 6,965,183 B2 | 11/2005 | Dooley | |
| 7,521,814 B2 | 4/2009 | Nasr | |
| 7,777,384 B2 | 8/2010 | Gieras | |
| 8,085,003 B2 | 12/2011 | Gieras | |
| 8,115,446 B2 | 2/2012 | Piccard | |
| 8,330,413 B2 | 12/2012 | Lazarovich | |
| 2010/0244599 A1 | 9/2010 | Saban | |
| 2015/0298627 A1 | 10/2015 | Nordlander | |

FOREIGN PATENT DOCUMENTS

| | | |
|---|---|---|
| CN | 105656269 | 6/2016 |
| FR | 2920260 | 2/2009 |

OTHER PUBLICATIONS

U.S. Appl. No. 15/207,901, filed Jul. 12, 2016 and entitled Integrated Modular Electric Power System for a Vehicle.
U.S. Appl. No. 15/236,890, filed Aug. 15, 2016 and entitled Active Rectifier Topology.

(Continued)

*Primary Examiner* — Pedro J Cuevas
(74) *Attorney, Agent, or Firm* — Snell & Wilmer L.L.P.

(57) ABSTRACT

A synchronous generator may comprise a rotor and a stator. The stator may comprise a first armature winding configured to output a first three-phase voltage, a second armature winding configured to output a second three-phase voltage, and a first variable inductor, wherein the first variable inductor is tunable in response to a rotational frequency of the rotor.

20 Claims, 5 Drawing Sheets

(56) References Cited

OTHER PUBLICATIONS

U.S. Appl. No. 15/249,639, filed Aug. 29, 2016 and entitled Power Generating Systems Having Synchronous Generator Multiplex Windings and Multilevel Inverters.
U.S. Appl. No. 15/348,313, filed Nov. 10, 2016 and entitled High Voltage Direct Current System for a Vehicle.
U.S. Appl. No. 15/348,335, filed Nov. 10, 2016 and entitled Electric Power Generating System With a Syncrhonous Generator.
U.S. Appl. No. 15/397,354, filed Jan. 3, 2017 and entitled Electric Power Generating System With a Permanent Magnet Generator.
U.S. Appl. No. 15/453,350, filed Mar. 8, 2017 and entitled Electric Power Generating System With a Permanent Magnet Generator and Combination of Active and Passive Rectifiers.
Xu, et al., "Reliability analysis and redundancy configuration of MMC with hybrid submodule topologies," IEEE Trans. Power Electron, vol. 31, No. 4, pp. 2720-2729, Apr. 2016.
Gupta, et al., "Multilevel inverter topologies with reduced device count: a review," IEEEE Trans. Power Electron, vol. 31, No. 1, pp. 135-151, Jan. 2016.
Soong, et al.., "Assessment of Fault Tolerance in Modular Multilevel Converters with Integrated Energy Storage," IEEE Trans. Power Electron., vol. 31, No. 6, pp. 4085-4095, Jun. 2016.

\* cited by examiner

ELECTRIC POWER GENERATING SYSTEM WITH A SYNCHRONOUS GENERATOR AND TUNABLE FILTER

FIELD

The disclosure generally relates to electrical power systems, and more particularly to the design of an electrical power generating system for a vehicle.

BACKGROUND

Ground vehicles, included those suitable for off road use, have migrated toward hybrid electric technology using high voltage direct current (HVDC) distribution. A synchronous generator may be used to generate electric power for an electronic power system. A synchronous generator typically includes a stator winding and a rotor winding to generate a single three-phase voltage. The three-phase voltage may be outputted to a rectifier for conversion to a DC voltage. Due to the nature of power processing during rectification, voltage ripple is typically present in the output voltage of the generator.

SUMMARY

A synchronous generator is disclosed herein, in accordance with various embodiments. The synchronous generator may comprise a rotor, a stator comprising a first armature winding configured to output a first three-phase voltage, a second armature winding configured to output a second three-phase voltage, and a first variable inductor, wherein the first variable inductor is tunable in response to a rotational frequency of the rotor.

In various embodiments, the stator may further comprise a first rectifier configured to rectify the first three-phase voltage received from the first armature winding, and a second rectifier configured to rectify the second three-phase voltage received from the second armature winding, wherein the first rectifier is configured to output a first direct current (DC) voltage and the second rectifier is configured to output a second DC voltage. The first variable inductor may be configured to filter at least one of the first DC voltage, the second DC voltage, and a DC output voltage. The rotor may comprise an exciter armature winding, a rotating rectifier, and a main field winding. The stator may further comprise an exciter field winding configured to control an output voltage of the synchronous generator. A phase shift between the first three-phase voltage and the second three-phase voltage may comprise 60/n degrees, where n is a total number of armature winding sets in the stator. The synchronous generator may further comprise a second variable inductor, a control winding of the second variable inductor connected in series with a control winding of the first variable inductor.

An electric power generating system is disclosed herein, in accordance with various embodiments. The electric power generating system may comprise a synchronous generator comprising a rotor and a stator. The stator may comprise a first armature winding configured to output a first three-phase voltage, and a second armature winding configured to output a second three-phase voltage, and a first variable inductor, wherein the first variable inductor is tunable in response to a rotational frequency of the rotor.

In various embodiments, the electric power generating system may further comprise a first rectifier configured to rectify the first three-phase voltage received from the first armature winding, and a second rectifier configured to rectify the second three-phase voltage received from the second armature winding, wherein the first rectifier is configured to output a first direct current (DC) voltage and the second rectifier is configured to output a second DC voltage. The electric power generating system may further comprise a first tunable notch filter comprising, a capacitor, and the first variable inductor, wherein the first tunable notch filter filters at least one of the first DC voltage and the second DC voltage. The electric power generating system may further comprise an auto-tuning notch filter control, comprising a frequency detector, a current regulator, a pulse width modulator, and an H-bridge, wherein the frequency detector detects the rotational frequency of the rotor and regulates a DC current through a control winding of the first variable inductor. The electric power generating system may further comprise a second variable inductor, a control winding of the second variable inductor connected in series with the control winding of the first variable inductor. The electric power generating system may further comprise a third variable inductor, a control winding of the third variable inductor connected in series with the control winding of the first variable inductor. The first variable inductor may be connected across the first rectifier, the second variable inductor may be connected across the second rectifier, and the third variable inductor is connected across both the first rectifier and the second rectifier. The first variable inductor may be configured to receive the current from a power supply via the H-bridge. The auto-tuning notch filter control may utilize a table look-up to determine the DC current based upon the rotational frequency of the rotor. At least one of the first variable inductor, the second variable inductor, and the third variable inductor may be mechanically coupled to the stator. The electric power generating system may further comprise a current sensor connected in series with the first variable inductor configured to send a current signal to the current regulator.

A method for generating electric power is disclosed herein, in accordance with various embodiments. The method may comprise rotating a rotor of a synchronous generator, generating, via a first stator armature winding, a first three-phase voltage in response to the rotating, generating, via a second stator armature winding, a second three-phase voltage in response to the rotating, rectifying, via a first rectifier, the first three-phase voltage into a first DC voltage, rectifying, via a second rectifier, the second three-phase voltage into a second DC voltage, and filtering, via a first tunable notch filter, at least one of the first DC voltage and the second DC voltage, wherein the first tunable notch filter is tunable in response to a rotational frequency of the rotor.

In various embodiments, the method may further comprise filtering, via a second tunable notch filter, at least one of the first DC voltage and the second DC voltage, wherein the first tunable notch filter comprises a first variable inductor and the second tunable notch filter comprises a second variable inductor, a control winding of the first variable inductor connected in series with a control winding of the first variable inductor.

The foregoing features, elements, steps, or methods may be combined in various combinations without exclusivity, unless expressly indicated herein otherwise. These features, elements, steps, or methods as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

As used herein, "electronic communication" means communication of electronic signals with physical coupling (e.g., "electrical communication" or "electrically coupled") or without physical coupling and via an electromagnetic field (e.g., "inductive communication" or "inductively coupled" or "inductive coupling"). In that regard, use of the term "electronic communication" includes both "electrical communication" and "inductive communication."

In various embodiments, synchronous generators of the present disclosure make use of multiple stator armature windings either disposed in a single stator or separate from the stator. Rectifiers are utilized for each respective stator armature winding. As a result, a plurality of outputs is connected in series to generate an HVDC output. One or more tunable notch filters may be electronically coupled across one or more rectifiers. A tunable notch filter may comprise a capacitor in series with a variable inductor. The variable inductor may comprise a primary winding, a partially saturated core, and a secondary winding. The ferromagnetic core of the variable inductor may be partially saturated by a DC current via the secondary winding. The secondary winding may be controllable via an auto-tuning notch filter control. The auto-tuning notch filter control may be tuned in response to a frequency of the synchronous generator, (e.g., a rotational frequency of a rotor). The tunable notch filters may mitigate voltage ripple of the HVDC output.

In this regard, EPGSs of the present disclosure may result in improved packaging by reducing the size of diodes included in the rectifiers. EPGSs of the present disclosure may have significant reduction in weight in filters, such as DC link capacitors, due to the decreased size of the capacitors. EPGSs of the present disclosure may generate a DC output voltage having reduced DC bus voltage ripple with low DC bus capacitance. EPGSs of the present disclosure may tend to minimize use of active power switches and associated control apparatus.

Figure 1A:
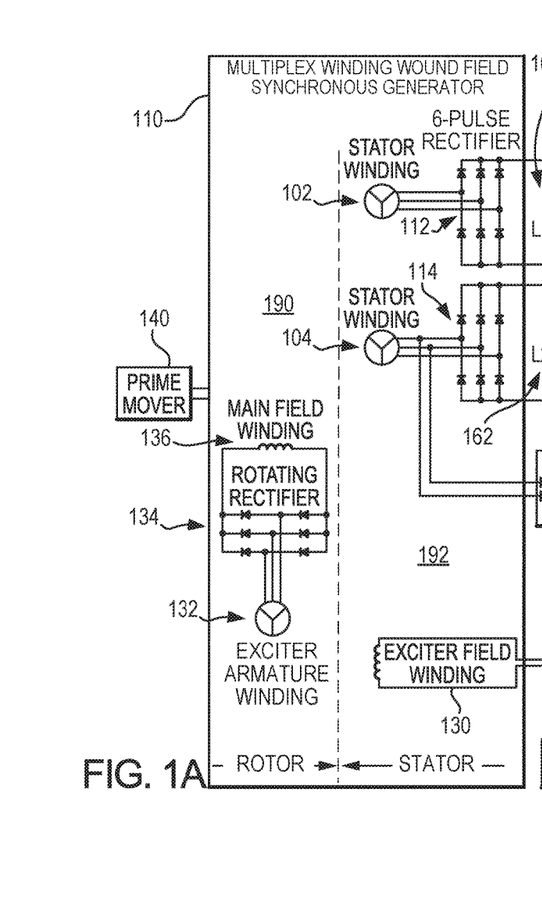
FIG. 1A illustrates a schematic view of an electric power generating system (EPGS), in accordance with various embodiments.

With reference to FIG. 1, a schematic view of an electric power generating system (EPGS) 100 is illustrated, in accordance with various embodiments. EPGS 100 may include a synchronous generator 110 in electronic communication with one or more tunable notch filters, as described below. Synchronous generator 110 may include a rotor 190 and a stator 192. Rotor 190 may be driven by a prime mover 140. In various embodiments, prime mover 140 may comprise an engine, such as a diesel engine for example. But, prime mover 140 may comprise any mover suitable for rotating rotor 190. Synchronous generator 110 may generate electric power in response to rotation of rotor 190. This electric power may be supplied to a DC load 122. In various embodiments, synchronous generator 110 may comprise a wound field synchronous generator.

In various embodiments, rotor 190 may comprise an exciter armature winding 132, a rotating rectifier 134, and a main field winding 136. Stator 192 may include a plurality of stator armature windings. These stator armature windings may include a first armature winding 102 and a second armature winding 104. However, it is contemplated herein that stator 192 may comprise any number of armature windings. In various embodiments, during normal operation of synchronous generator 110, a DC current (i.e., via external DC power supply 128) is applied to the rotor main field winding 136 to produce a rotor magnetic field. The rotor 190 is turned by an external device (e.g., prime mover 140) producing a rotating magnetic field, which induces a 3-phase voltage within each of the stator windings. First armature winding 102 may be configured to output a first three-phase voltage in response to the rotation of rotor 190. Second armature winding 104 may be configured to output a second three-phase voltage in response to the rotation of rotor 190.

The number of three-phase armature winding sets (i.e., first armature winding 102, second armature winding 104, etc.) may include any number n of stator armature windings, such as two or more armature windings. The phase shift between armature windings should be 60/n. Thus, in the exemplary embodiment of FIG. 1, the phase shift between armature windings is 60/2, or 30. This phase shift may be achieved by distribution of windings in slots of the stator. This feature enables reduction of the voltage ripple at the DC bus (i.e., across positive terminal 142 and negative terminal 144) and reduction of the size of output filters, as described herein.

A first rectifier 112 may rectify the first three-phase voltage. Stated another way, the first rectifier 112 may convert the first three-phase voltage from a three-phase voltage to a direct current (DC) voltage. Similarly, a second rectifier 114 may rectify the second three-phase voltage. First rectifier 112 may comprise a six-pulse rectifier. First rectifier 112 may comprise a plurality of diodes.

The first rectifier 112 may output the first rectified voltage, now a first DC voltage, where it may be received by electronic components located externally from the synchronous generator 110. In this regard, first rectifier 112 and second rectifier 114 may be housed within synchronous generator 110. However, although illustrated as being internal to synchronous generator 110, it is contemplated herein that first rectifier 112 and second rectifier 114 may be located externally from synchronous generator 110.

Figure 1B:
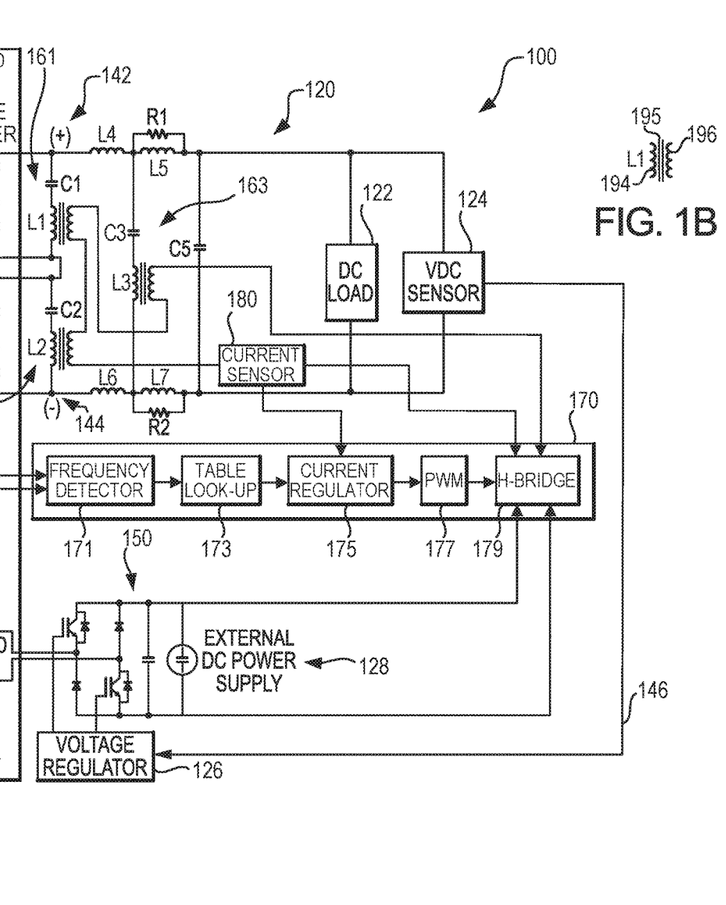
FIG. 1B illustrates a schematic view of a variable inductor comprising a primary winding, a ferromagnetic core, and a secondary control winding, in accordance with various embodiments.

A first tunable notch filter 161 may be connected across first rectifier 112. First tunable notch filter 161 may comprise a capacitor C1 and a variable inductor (also referred to herein as a first variable inductor) L1. A second tunable notch filter 162 may be connected across second rectifier 114. Second tunable notch filter 162 may comprise a capacitor C2 and a variable inductor (also referred to herein as a second variable inductor) L2. A third tunable notch filter 163 may be connected across both first rectifier 112 and second rectifier 114. Third tunable notch filter 163 may comprise a capacitor C3 and a variable inductor (also referred to herein as a third variable inductor) L3. With momentary reference to FIG. 1B, an isolated view of variable inductor L1 is illustrated. It should be appreciated, that the variable inductors (i.e., L1, L2, and L3) each comprise a primary winding 194, a ferromagnetic core 195, and a secondary winding (also referred to herein as a control winding) 196. As should be appreciated, the DC current in the secondary winding partially saturates the ferromagnetic core resulting in controlling the inductance in the primary winding. As described herein, any reference to a variable inductor winding being connected in series refers to the secondary winding of the variable inductor being connected in series. In this regard, the secondary windings of variable inductor L1, variable inductor L2, and variable inductor L3 may be connected in series, as discussed herein.

Although illustrated as comprising all three variable inductors L1, L2, and L3, it is contemplated herein that an EPGS 100 may comprise only variable inductor L1 and variable inductor L2. Furthermore, it is contemplated herein that an EPGS 100 may comprise only variable inductor L3. Furthermore, EPGS 100 may comprise any number of variable inductors.

In addition to the tunable notch filters, an output filter 120 may be provided. Output filter 120 may comprise inductor L4, inductor L5, inductor, L6, inductor L7, resistor R1, resistor R2, and capacitor C5. Inductor L4 may be connected in series with positive terminal 142 and connected in series with resistor R1 and inductor L5. Resistor R1 and inductor L5 may be connected in parallel. Inductor L6 may be connected in series with negative terminal 144 and connected in series with resistor R2 and inductor L7. Resistor R2 and inductor L7 may be connected in parallel. Capacitor C5 may be connected in series between inductor L5 and inductor L7. Output filter 120 may improve the quality of the DC output voltage. In various embodiments, tunable notch filter 163 may be connected between inductor L4 and inductor L5 and between inductor L6 and inductor L7.

Tunable notch filter 161 may reduce or eliminate voltage ripple in the first DC voltage. Tunable notch filter 162 may reduce or eliminate voltage ripple in the second DC voltage. A DC output voltage comprising the sum of the voltages of the first DC voltage and the second DC voltage may be passed to tunable notch filter 163. It should be appreciated that the DC output voltage (i.e., the voltage across positive terminal 142 and negative terminal 144) equals the sum of the voltages across each of rectifier 112 and rectifier 114. So the voltage rating, and thus the physical size, of the diodes in rectifiers 112 and 114 are reduced relative to the DC output voltage because said diodes only handle a portion of said voltage, and in this case approximately one half of said voltage. Similarly, the physical size of capacitors C1 and C2 are considerably reduced. Moreover, the size of the output filter 120 and capacitor C3 is considerably reduced because the voltage ripple is reduced.

A load 122 may receive the filtered DC output voltage. In various embodiments, load 122 may comprise a high voltage load. For example, load 122 may receive a DC output voltage of, for example, six hundred volts (600 V).

A voltage sensor 124 may be connected across load 122. Voltage regulator 126 may receive sensor signal 146 from voltage sensor 124 and may regulate the voltage across load 122 via external DC power supply 128, converter 150, and exciter field winding 130. In various embodiments, external DC power supply 128 may comprise a battery. In various embodiments, external DC power supply 128 may comprise a separate synchronous generator driven by the same prime mover 140. Converter 150 may comprise an asymmetric H-bridge topology. Exciter field winding 130 may be in electronic communication with main field winding 136. Voltage regulator 126 may control converter 150 to vary the voltage supplied to exciter field winding 130 in response to sensor signal 146. In this regard, the exciter field winding 130 may control the DC output voltage of synchronous generator 110. Stated another way, the voltage regulator 126 may control the main field winding 136 via the exciter field winding 130.

EPGS 100 may comprise an auto-tuning notch filter control 170. Auto-tuning notch filter control 170 may comprise a frequency detector 171, a table look-up logic 173, a current regulator 175, a pulse width modulator (PWM) 177, and an asymmetric H-bridge 179. Frequency detector 171 may detect a rotational frequency of the rotor and regulate a current through the secondary windings of variable inductor L1, variable inductor L2, and variable inductor L3. Auto-tuning notch filter control 170 may comprise a current sensor 180. Current sensor 180 may be connected in series with the secondary windings of variable inductor L1, variable inductor L2, and variable inductor L3. Current sensor 180 may be configured to send a current signal to the current regulator 175 indicative of the current through the secondary windings of variable inductor L1, variable inductor L2, and/or variable inductor L3.

Frequency detector 171 may detect a frequency of the output from armature winding 104. Table look-up logic 173 may utilize stored data to determine an optimal current to send to the secondary windings of variable inductor L1, variable inductor L2, and/or variable inductor L3 in response to the detected frequency. A current regulator 175 may determine a current through the secondary windings of variable inductor L1, variable inductor L2, and/or variable inductor L3, via current sensor 180, to provide an input to PWM 177. PWM 177 may control asymmetric H-bridge 179. Asymmetric H-bridge 179 may control the current flowing from external DC power supply 128 through the secondary windings of variable inductor L1, variable inductor L2, and/or variable inductor L3. In various embodiments, the topology of asymmetric H-bridge 179 may be similar to converter 150. In this regard, auto-tuning notch filter control 170 is auto-tunable in response to the rotational velocity of rotor 190.

Figure 2:
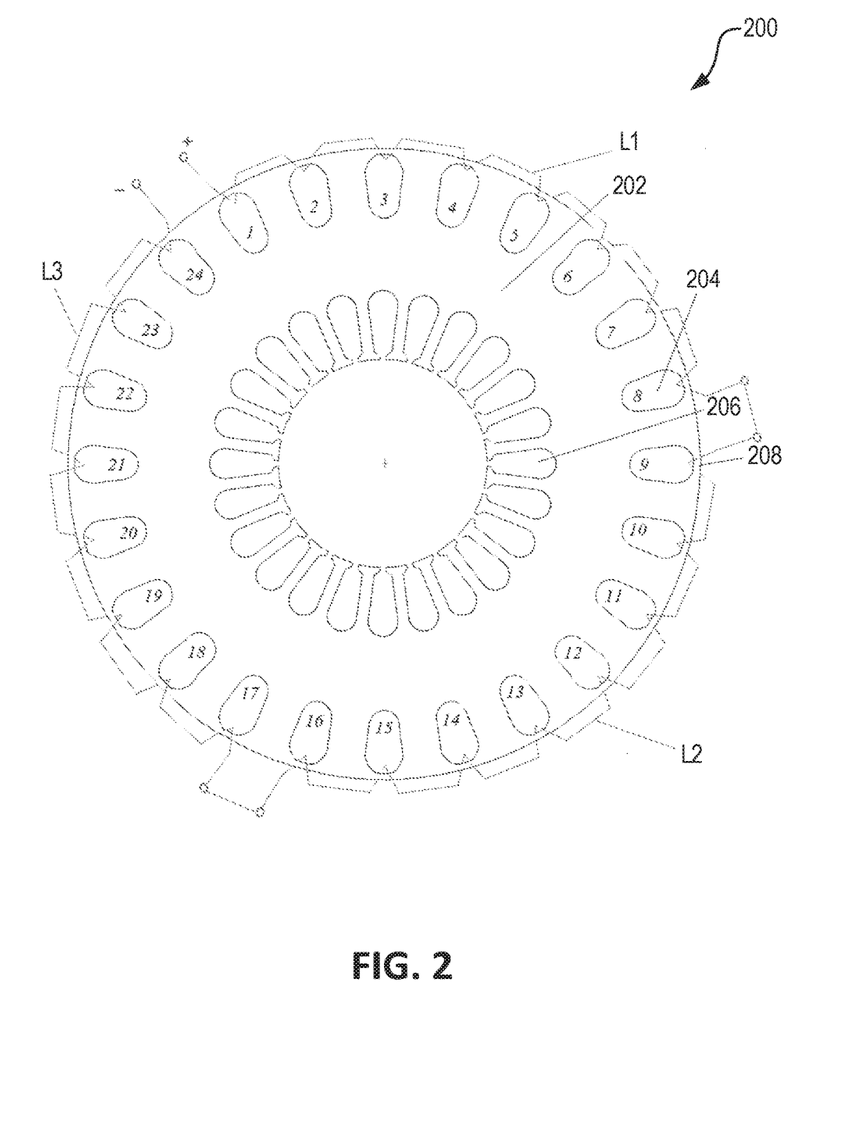
FIG. 2 illustrates a schematic view of an outer stator for a synchronous generator with variable inductor windings disposed within radially outer slots of the stator, in accordance with various embodiments.

In various embodiments, variable inductor L1, variable inductor L2, and/or variable inductor L3 may be located externally from synchronous generator 110. However, it is contemplated herein that variable inductor L1, variable inductor L2, and/or variable inductor L3 may be located internally to synchronous generator 110. In this regard, with reference to FIG. 2, a stator 200 for a synchronous generator is illustrated, in accordance with various embodiments. In various embodiments, stator 200 may comprise a ferromagnetic core 202. Stator 200 may comprise a plurality of closed slots 204. Plurality of closed slots 204 may comprise radially outer slots, relative to the centerline axis of stator 200. Windings of variable inductors L1, L2, L3 may be disposed within plurality of closed slots 204. FIG. 2 illustrates the secondary windings of variable inductors L1, L2, L3. The primary windings of variable inductors L1, L2, L3 are omitted in FIG. 2 for clarity purposes. Outer stator 200 may comprise a plurality of semi-open slots 206. Armature windings (e.g., armature winding 102 and/or armature winding 104) may be disposed in plurality of semi-open slots 206. Stator 200 may comprise a plurality of ferromagnetic bridges 208. Ferromagnetic bridges 208 may enclose the plurality of closed slots 204. Windings of variable inductors L1, L2, L3 may be wrapped around plurality of ferromagnetic bridges 208.

Stator 200 is illustrated as having 24 closed slots 204. However, stator 200 may have any number of closed slots 204. The windings of variable inductor L1 may occupy one-third of the closed slots 204 (e.g., eight of the twenty-four closed slots 204). The windings of variable inductor winding L2 may occupy one-third of the closed slots 204 (e.g., eight of the twenty-four closed slots 204). The windings of variable inductor winding L3 may occupy one-third of the closed slots 204 (e.g., eight of the twenty-four closed slots 204).

Figure 3:
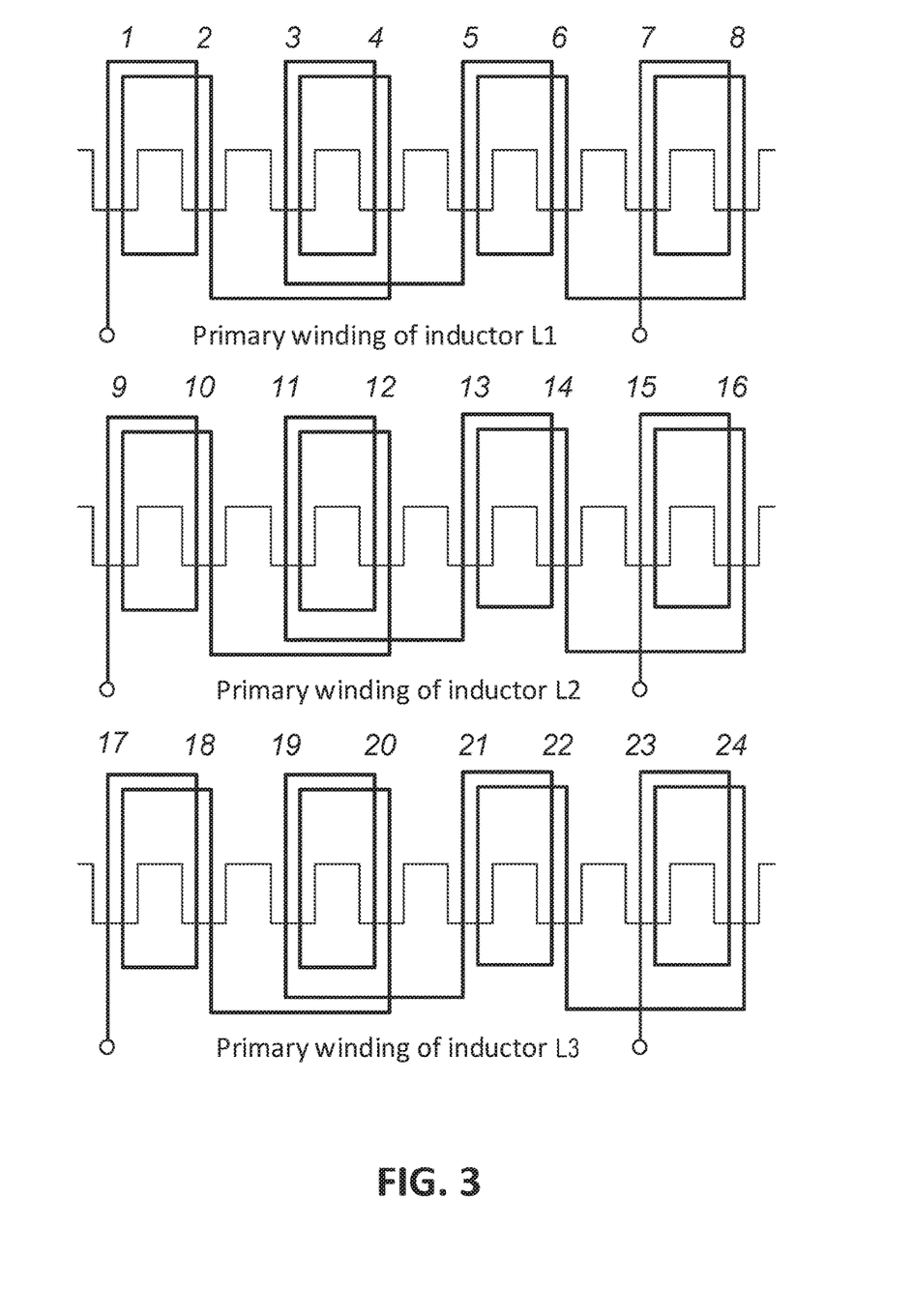
FIG. 3 illustrates a wiring diagram for variable inductor windings relative to the stator slots of FIG. 2 and FIG. 4, in accordance with various embodiments.

With reference to FIG. 3, a wiring diagram of the primary windings of variable inductors L1, L2, and L3 is illustrated, in accordance with various embodiments. The numbers 1, 2, 3, [ . . . ] correspond to the closed slots 204 of FIG. 2 and the closed slots 404 of FIG. 4.

Figure 4:
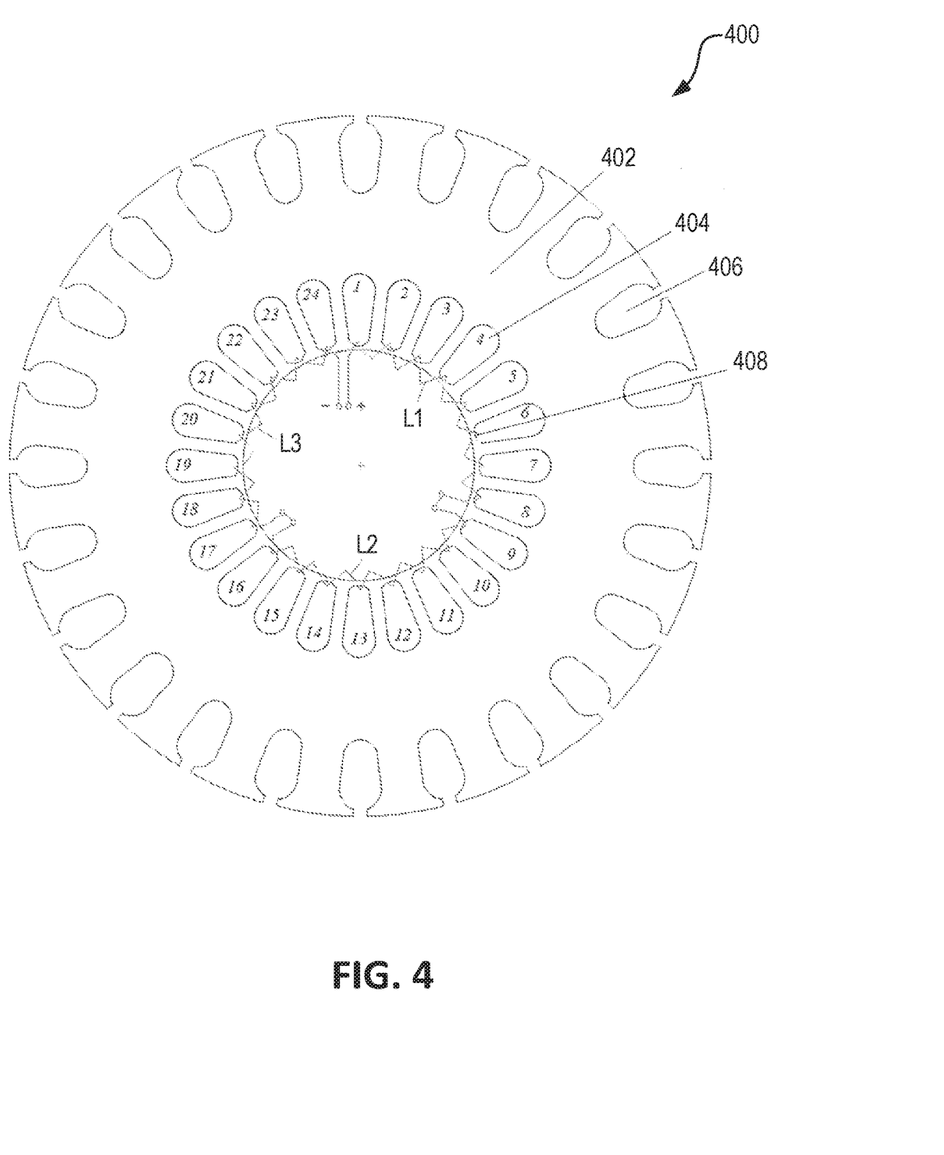
FIG. 4 illustrates a schematic view of an inner stator for a synchronous generator with variable inductor windings disposed within radially inner slots of the stator, in accordance with various embodiments.

With reference to FIG. 4, an inner stator 400 for a synchronous generator is illustrated, in accordance with various embodiments. In various embodiments, stator 400 may comprise a ferromagnetic core 402. Stator 400 may comprise a plurality of closed slots 404. Plurality of closed slots 404 may comprise radially inner slots, relative to the centerline axis of stator 400. Windings of variable inductors L1, L2, L3 may be disposed within plurality of closed slots 404. FIG. 4 illustrates the secondary windings of variable inductors L1, L2, L3. The primary windings of variable inductors L1, L2, L3 are omitted in FIG. 4 for clarity purposes. Stator 400 may comprise a plurality of semi-open slots 406. Armature windings (e.g., armature winding 102 and/or armature winding 104) may be disposed in plurality of semi-open slots 406. Stator 400 may comprise a plurality of ferromagnetic bridges 408. Ferromagnetic bridges 408 may enclose the plurality of closed slots 404. Variable inductors L1, L2, L3 may be wrapped around plurality of ferromagnetic bridges 408.

Figure 5:
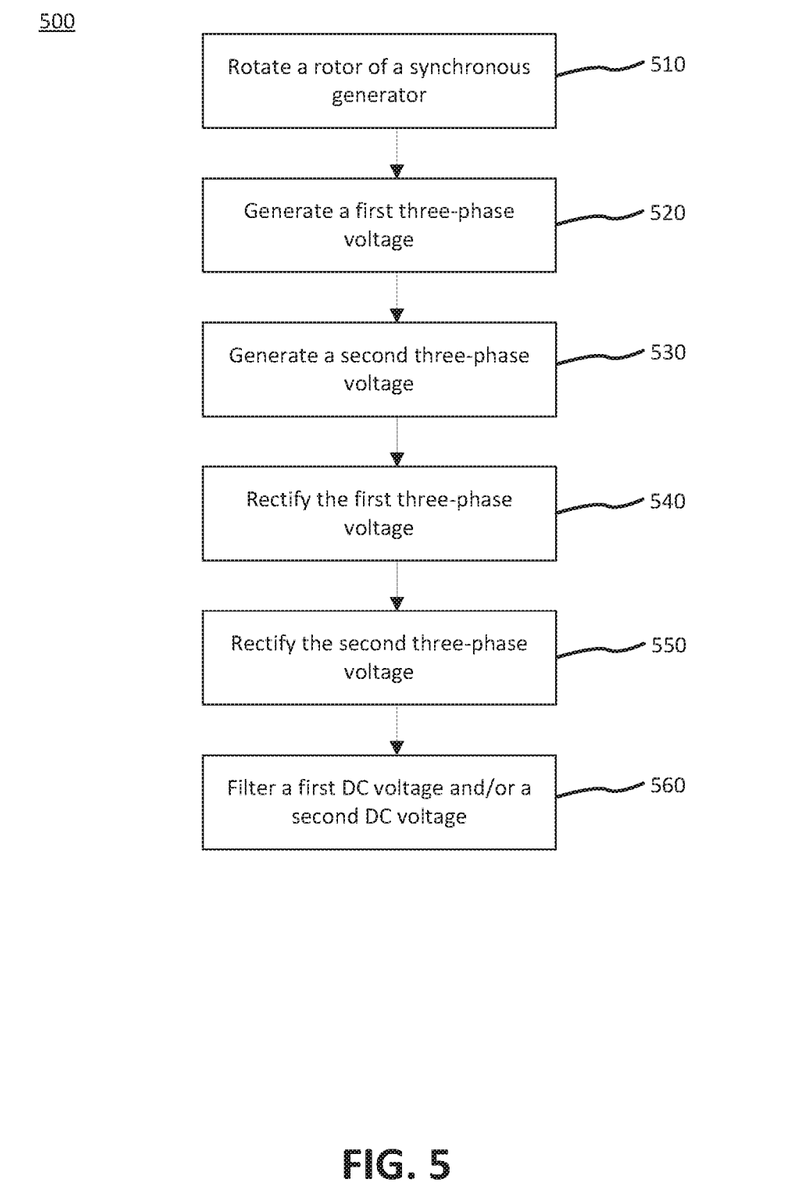
FIG. 5 illustrates a method for generating electric power, in accordance with various embodiments.

With combined reference to FIG. 5, a method 500 for generating electric power is illustrated, in accordance with various embodiments. Method 500 includes rotating a rotor of a synchronous generator (step 510). Method 500 includes generating a first three-phase voltage (step 520). Method 500 includes generating a second three-phase voltage (step 530). Method 500 includes rectifying the first three-phase voltage (step 540). Method 500 includes rectifying the second three-phase voltage (step 550). Method 500 includes filtering a first DC voltage and/or a second DC voltage (step 260).

With combined reference to FIG. 1 and FIG. 5, step 510 may include rotating rotor 190 of synchronous generator 110. Step 520 may include generating, via first armature winding 102, a first three-phase voltage in response to the rotation. Step 530 may include generating, via second armature winding 104, a second three-phase voltage in response to the rotation. Step 540 may include rectifying, via first rectifier 112, the first three-phase voltage into a first DC voltage. Step 550 may include rectifying, via second rectifier 114, the second three-phase voltage into a second DC voltage. Step 560 may include filtering, via first tunable notch filter 161, the first DC voltage. Step 560 may include filtering, via second tunable notch filter 162, the second DC voltage. Step 560 may include filtering, via third tunable notch filter 163, the DC output voltage.

Benefits, other advantages, and solutions to problems have been described herein with regard to specific embodiments. Furthermore, the connecting lines shown in the various figures contained herein are intended to represent various functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A synchronous generator comprising:
    a rotor;
    a stator comprising:
        a first armature winding configured to output a first three-phase voltage;
        a second armature winding configured to output a second three-phase voltage; and
        a first variable inductor;
    wherein the first variable inductor is tunable in response to a rotational frequency of the rotor.

2. The synchronous generator of claim 1, wherein the stator further comprises:
    a first rectifier configured to rectify the first three-phase voltage received from the first armature winding; and
    a second rectifier configured to rectify the second three-phase voltage received from the second armature winding,
    wherein the first rectifier is configured to output a first direct current (DC) voltage and the second rectifier is configured to output a second DC voltage.

3. The synchronous generator of claim 2, wherein the first variable inductor is configured to filter at least one of the first DC voltage, the second DC voltage, and a DC output voltage.

4. The synchronous generator of claim 1, wherein the rotor comprises an exciter armature winding, a rotating rectifier, and a main field winding.

5. The synchronous generator of claim 4, wherein the stator further comprises an exciter field winding configured to control an output voltage of the synchronous generator.

6. The synchronous generator of claim 5, wherein a phase shift between the first three-phase voltage and the second three-phase voltage comprises 60/n degrees, where n is a total number of armature winding sets in the stator.

7. The synchronous generator of claim 3, further comprising a second variable inductor, a control winding of the second variable inductor connected in series with a control winding of the first variable inductor.

8. An electric power generating system comprising,
    a synchronous generator comprising:
        a rotor; and
        a stator comprising:
            a first armature winding configured to output a first three-phase voltage; and
            a second armature winding configured to output a second three-phase voltage; and
        a first variable inductor,
    wherein the first variable inductor is tunable in response to a rotational frequency of the rotor.

9. The electric power generating system of claim 8, further comprising:
    a first rectifier configured to rectify the first three-phase voltage received from the first armature winding; and
    a second rectifier configured to rectify the second three-phase voltage received from the second armature winding;
    wherein the first rectifier is configured to output a first direct current (DC) voltage and the second rectifier is configured to output a second DC voltage.

10. The electric power generating system of claim 9, further comprising a first tunable notch filter comprising:
    a capacitor; and
    the first variable inductor,
    wherein the first tunable notch filter filters at least one of the first DC voltage and the second DC voltage.

11. The electric power generating system of claim 10, further comprising an auto-tuning notch filter control, comprising:
    a frequency detector;
    a current regulator;
    a pulse width modulator; and
    an H-bridge,
    wherein the frequency detector detects the rotational frequency of the rotor and regulates a DC current through a control winding of the first variable inductor.

12. The electric power generating system of claim 11, further comprising a second variable inductor, a control winding of the second variable inductor connected in series with the control winding of the first variable inductor.

13. The electric power generating system of claim 12, further comprising a third variable inductor, a control winding of the third variable inductor connected in series with the control winding of the first variable inductor.

14. The electric power generating system of claim 13, wherein the first variable inductor is connected across the first rectifier,
    the second variable inductor is connected across the second rectifier, and
    the third variable inductor is connected across both the first rectifier and the second rectifier.

15. The electric power generating system of claim 11, wherein the first variable inductor is configured to receive the current from a power supply via the H-bridge.

16. The electric power generating system of claim 15, wherein the auto-tuning notch filter control utilizes a table look-up to determine the DC current based upon the rotational frequency of the rotor.

17. The electric power generating system of claim 14, wherein at least one of the first variable inductor, the second variable inductor, and the third variable inductor is mechanically coupled to the stator.

18. The electric power generating system of claim 11, further comprising a current sensor connected in series with the first variable inductor configured to send a current signal to the current regulator.

19. A method for generating electric power comprising:
    rotating a rotor of a synchronous generator;
    generating, via a first stator armature winding, a first three-phase voltage in response to the rotating;
    generating, via a second stator armature winding, a second three-phase voltage in response to the rotating;

rectifying, via a first rectifier, the first three-phase voltage into a first DC voltage;
rectifying, via a second rectifier, the second three-phase voltage into a second DC voltage; and
filtering, via a first tunable notch filter, at least one of the first DC voltage and the second DC voltage, wherein the first tunable notch filter is tunable in response to a rotational frequency of the rotor.

20. The method of claim 19, further comprising:
filtering, via a second tunable notch filter, at least one of the first DC voltage and the second DC voltage, wherein the first tunable notch filter comprises a first variable inductor and the second tunable notch filter comprises a second variable inductor, a control winding of the first variable inductor connected in series with a control winding of the first variable inductor.

\* \* \* \* \*